United States Patent
Chen et al.

(10) Patent No.: US 8,653,438 B2
(45) Date of Patent: Feb. 18, 2014

(54) OPTICAL INPUTTING MODULE OF AN ELECTRONIC DEVICE FOR SENSING MOVEMENT OF OBJECT AND ITS LIGHT SOURCE UNIT

(75) Inventors: Chih-Cheng Chen, Zhongli (TW); Jin-Shan Pan, Hsinchu (TW)

(73) Assignee: True Light Corporation, Hsinchu (TW)

( * ) Notice: Subject to any disclaimer, the term of this patent is extended or adjusted under 35 U.S.C. 154(b) by 261 days.

(21) Appl. No.: 13/239,353

(22) Filed: Sep. 21, 2011

(65) Prior Publication Data
US 2013/0015334 A1   Jan. 17, 2013

(30) Foreign Application Priority Data
Jul. 12, 2011   (TW) .............................. 100124691 A

(51) Int. Cl.
*H01J 40/14*   (2006.01)

(52) U.S. Cl.
USPC ..................................... 250/221; 250/227.22

(58) Field of Classification Search
USPC ............ 250/221, 227.24, 227.2, 227.22, 556; 257/80–85; 362/293, 606–615, 311.14; 356/72, 73, 316; 313/292, 504–512; 385/11–14, 50
See application file for complete search history.

(56) References Cited

U.S. PATENT DOCUMENTS 6,872,931 B2 *   3/2005   Liess et al. .................... 250/221
7,942,565 B2 *   5/2011   Klick et al. .................... 362/610

* cited by examiner

*Primary Examiner* — Que T Le
(74) *Attorney, Agent, or Firm* — Chun-Ming Shih; HDLS IPR Services

(57) ABSTRACT

A light source unit is disclosed for arranging on a plane and emitting a light beam oblique to the plane. The light source unit includes an illuminant element and a transparent encapsulator. The illuminant element has an upper surface and a lower surface both parallel to the plane. The transparent encapsulator physically contacts with the illuminant element and at least covers the upper surface of the illuminant element. The transparent encapsulator has an oblique surface above the upper surface and oblique to the upper surface. In addition, an optical inputting module having the light source unit mentioned above is disclosed.

14 Claims, 3 Drawing Sheets

OPTICAL INPUTTING MODULE OF AN ELECTRONIC DEVICE FOR SENSING MOVEMENT OF OBJECT AND ITS LIGHT SOURCE UNIT

BACKGROUND OF THE INVENTION

1. Field of the Invention

The present invention relates to an inputting module of an electronic device, and in particular to an optical finger navigation module.

2. Description of Prior Art

Optical finger navigation (OFN) inputting module has advantages of small volume, high precision of navigation and low power consumption. The optical finger navigation inputting module optically senses the movement of finger touching or sliding thereon. The optical finger navigation inputting module can be used to replace multi-direction keypad and is widely applied in movable electronic device, such as smart phone, personal media player, digital camera and global positioning system (GPS) navigator.

Optical finger navigation inputting module emits a light beam with particular wavelength to an operation plane provided for the object to touch or slide thereon so that the sensing element of the optical finger navigation inputting module can clearly sense a reflected light beam reflected from the operation plane. By comparing the reflected light beam reflected at different time, the sensing element can determine the movement direction and distance. For the sake of easily manufacture, the illuminant element and sensing element of conventional optical finger navigation inputting module are disposed on the same circuit board and a prism or other optical element is needed to deflect light beam (emitted by the illuminant element) obliquely such that the light beam emits toward the operation plane. Therefore, the sensing element can successfully sense the reflected light beam reflected from the operation plane.

However, the prism has a predetermined thickness for providing sufficient optical path difference (OPD) and deflected light beam at a predetermined angle, so that the optical finger navigation inputting module is becoming thicker and harder to apply in a thin, light and compact electronic device.

SUMMARY OF THE INVENTION

It is an object of the present invention to provide a light source unit, the light source unit can directly provide an oblique light beam without addition optical elements, such as a prism.

It is another object of the present invention to provide an optical inputting module, the optical inputting module can directly deflect light beam without addition optical elements, such as a prism.

Accordingly, the present invention provides a light source unit for arranging on a plane and emitting light beam obliquely to the plane. The light source unit comprises an illuminant element and a transparent encapsulator. The illuminant element has an upper surface and a lower surface both parallel to the plane. The transparent encapsulator is physically contacted with the illuminant element and at least covering the upper surface of the illuminant element, the transparent encapsulator has an oblique surface above the upper surface of the illuminant element and oblique to the upper surface.

The present invention further provides an optical inputting module for sensing a movement from the operation plane. The optical inputting module comprises an operation plane, a circuit board, a light source unit and a sensing unit. The operation plane is allowing the sensing body sliding thereon. The circuit board is located under the operation plane and substantially parallel to the operation plane. The light source unit is disposed on the operation plane and emitting light beam obliquely to the operation plane. The light source unit comprises an illuminant element and a transparent encapsulator. The illuminant element has an upper surface and a lower surface both parallel to the plane. The transparent encapsulator is physically contacted with the illuminant element and at least covering the upper surface of the illuminant element. The transparent encapsulator has an oblique surface above the upper surface of the illuminant element and oblique to the upper surface. The sensing unit is disposed on the circuit board for sensing a reflected light beam reflected from the operation plane.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
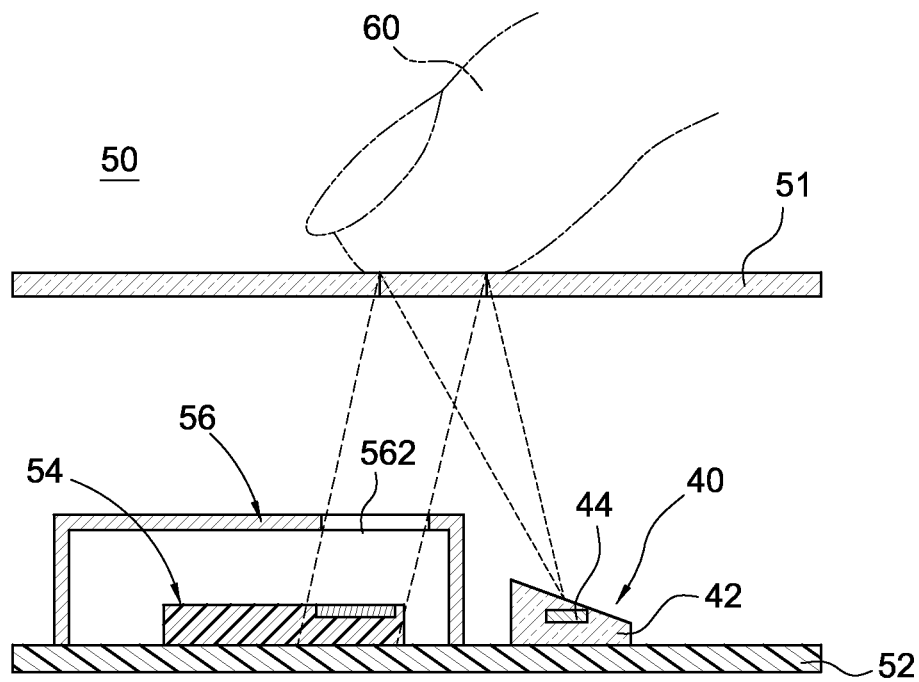
FIG. 1 is a sectional view of an optical inputting module according to a first preferred embodiment of the present invention.

An optical inputting module of the present invention can sense a sensing body which is touching and sliding thereon and then provide a movement signal to an electronic device with the optical inputting module. Reference is made to FIG. 1, which is a sectional view of an optical inputting module according to a first preferred embodiment of the present invention. The optical inputting module 50 includes an operation plane 51, a circuit board 52, a sensing unit 54 and a light source unit 40.

The operation plane 51 is provided for the sensing body 60 to touch or slide on its upper surface. In this embodiment, the sensing body 60 is, but not limited to, a finger. The circuit board 52 is located under the operation plane 51 and has a predetermined distance with the operation plane 51, where the circuit board 52 and the operation plane 51 are parallel to each other. The light source unit 40 is disposed on an upper surface of the circuit board 52 and emits a light beam obliquely to the operation plane 51.

Figure 2:
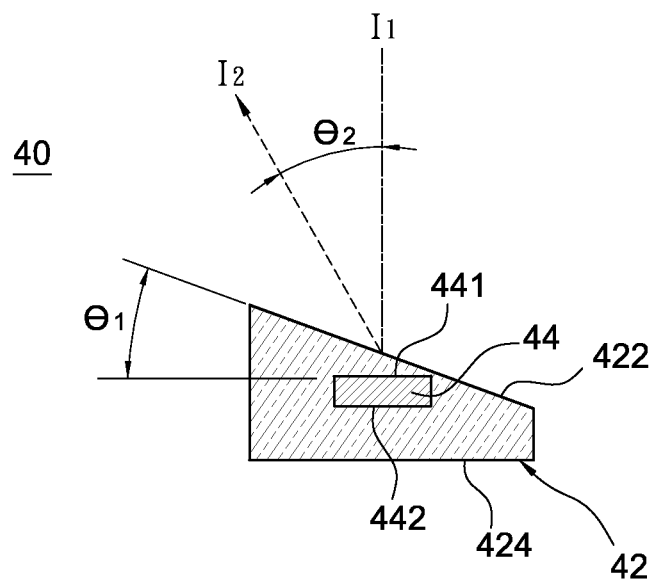
FIG. 2 is a sectional view of a light source unit according to a first preferred embodiment of the present invention.

Reference is made to FIG. 2, which is a sectional view of a light source unit according to a first preferred embodiment of the present invention. The light source unit 40 includes an illuminant element 44 and a transparent encapsulator 42. The illuminant element 44 has an upper surface 441 and a lower surface 442 and both are substantially parallel. In particular, the illuminant element 44 can be a vertical-cavity surface emitting laser (VCSEL) chip. The transparent encapsulator 42 is physically contacted with the illuminant element 44 and covers the upper surface 441 and laterals thereof. The transparent encapsulator 42 has a bottom surface 424 substantially parallel to the lower surface 442 of the illuminant element 44. In this embodiment, the transparent encapsulator 42 hermetically seals the illuminant element 44 so as to prevent the illuminant element 44 from damage and degrading luminous characteristic thereof.

Figure 3:
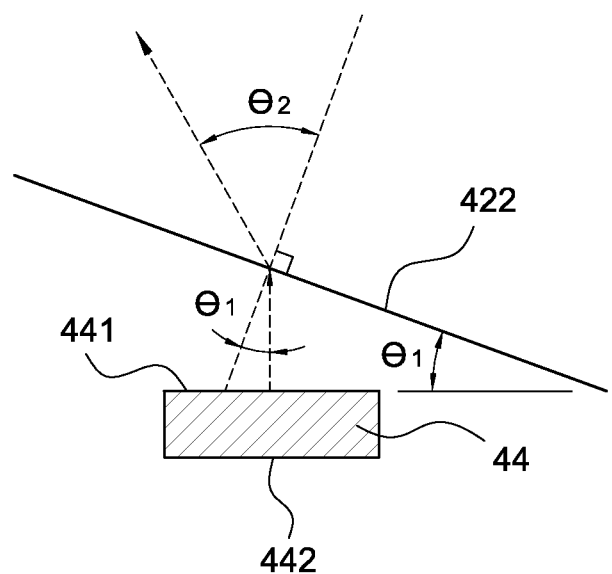
FIG. 3 is a schematic view of the light source unit according to the first preferred embodiment of the present invention.

It should be noted that the transparent encapsulator 42 has an oblique surface 422 above the upper surface 441 of the illuminant element 44 and the oblique surface 422 is oblique to the upper surface 441. In particularly, an incident-angle $\theta 1$ formed between the oblique surface 422 and the upper surface 441 is between 5 and 25 degrees. The light beam upwardly emitted from the illuminant element 44 travels in the transparent encapsulator 42 and is refracted by the oblique surface 422. The travelling direction of the light beam refracted by the oblique surface 422 is oblique to a normal of the upper surface 441 of the illuminant element 44 with a refraction angle $\theta 2$. In more particularly, with reference to FIG. 3, the light beam upwardly emitted from the upper surface 441 of the illuminant element 44 travels to the oblique surface 422 with the angle which is the same as the incident-angle $\theta 1$. Because the refraction indexes between upper side and lower side of the oblique surface 422 are difference, the light beam is refracted by the oblique surface 422 with the refraction angle $\theta 2$ according to Snell's Law.

In another embodiment of the present invention, the transparent encapsulator 44 can just have a portion where the upper surface 441 of the illuminant element 44 is projected thereon in a situation that the transparent encapsulator 42 is not required to hermetically cover the illuminant element 44, and the oblique surface 422 of the transparent encapsulator 42 refracts the light beam emitted from the illuminant element 44 as mentioned above.

With reference again to FIG. 1, the sensing unit 54 is disposed on the circuit board 52 and senses images of the sensing body 60 touching or sliding on the operation plane 51. The sensing unit 54 is, but not limited to, a complementary metal-oxide-semiconductor (CMOS) image sensing element. The sensing unit 54 receives a reflecting light beam while the sensing body 60 touching or sliding on the upper surface of the operation plane 51 and convers the light beam to corresponding electrical signal.

Moreover, the optical inputting module of the present invention further includes a shield 56 positioned on the sensing unit 54. The shield 56 has a through-hole 562 to allow the reflected light beam passing through and to prevent outward light beams from inputting into the sensing unit 54 and scattering the sensing effect of the sensing unit 54.

Figure 4:
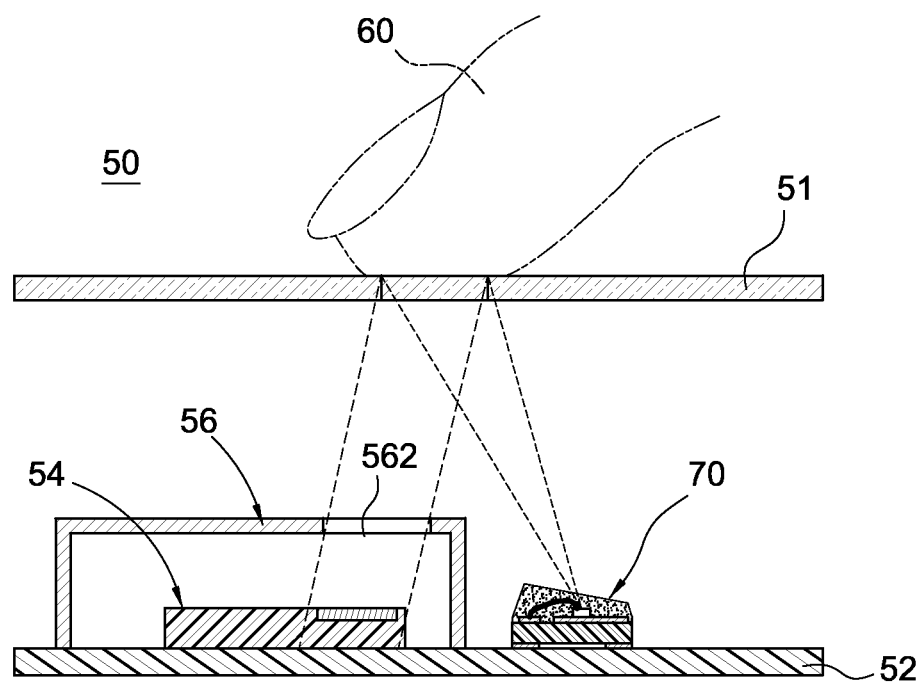
FIG. 4 is a sectional view of an optical inputting module according to a second preferred embodiment of the present invention.
Figure 5:
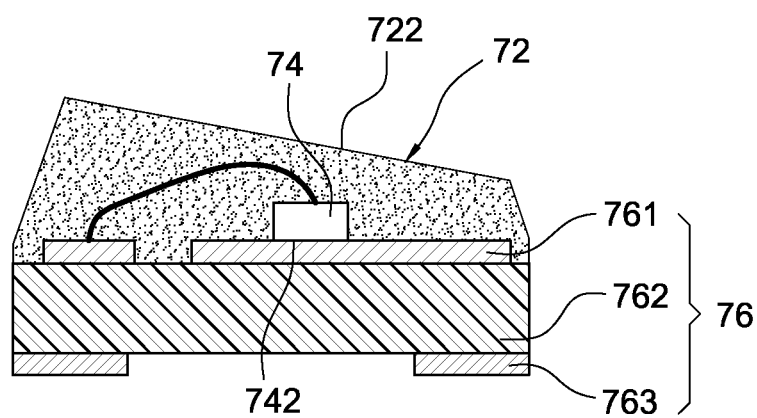
FIG. 5 is a partially sectional view of a light source unit of a second preferred embodiment of the present invention.

Reference is made to FIG. 4, which is a sectional view of an optical inputting module according to a second preferred embodiment of the present invention. This embodiment is similar to the first embodiment mentioned above. The difference is that the light source unit 70 further includes a substrate 76 physically contacted with the lower surface 742 of the illuminant element 74, with reference to FIG. 5. The substrate 76 has a first electrode layer 761 connected to the illuminant element 74, an isolating layer 762 under the first electrode layer 761 and a second electrode layer 763 under the isolating layer 762 and electrically connected to the first electrode layer 761. The first electrode layer 761 is electrically connected to the second electrode layer 763 by wires passing through or reeling in the isolating layer 762 and the second electrode layer 763 is electrically connected to a circuit board of an electrical device by surface mount technology. Moreover, the substrate 76 and the transparent encapsulator 72 collectively and hermetically cover the illuminant element 74 so as to prevent the illuminant element 74 from damage and degrading luminous characteristic thereof.

To sum up, the embodiment mentioned above, oblique surface 422, 722 is directly formed on the transparent encapsulator 42, 72 to refract light beam directly and the transparent encapsulator 42 under the oblique surface 422, 722 to provide optical path difference and achieve light refraction without prism. Therefore, the transparent encapsulator 42, 72 of the present invention not only hermetically covers the illuminant element 44, 74, but also protects the illuminant element 44, 74 and has a function of light refraction.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A light source unit for arranging on a plane and emitting light beam oblique to the plane, the light source unit comprising:
    an illuminant element, being a laser element, having an upper surface and a lower surface both parallel to the plane;
    a transparent encapsulator physically contacted with the illuminant element and at least covering the upper surface of the illuminant element, the transparent encapsulator having an oblique surface above the upper surface of the illuminant element and oblique to the upper surface,
    wherein the laser element is disposed inside the transparent encapsulator, and the light beam emitted from the laser element is refracted through the oblique surface to an object sliding on an operation plane of an optical inputting module of an electronic device so that an movement of the object is measured.

2. The light source unit in claim 1, wherein the oblique surface is obliqued with respect to the upper surface at angles between 5 and 25 degrees.

3. The light source unit in claim 1, wherein the transparent encapsulator has a bottom surface substantially parallel to the plane and covering the upper surface of the illuminant element.

4. The light source unit in claim 3, wherein the transparent encapsulator hermetically covers the illuminant element.

5. The light source unit is claim 1, further comprising a substrate physically contacted the lower surface of the illuminant element, the substrate having a first electrode layer connected to the illuminant element, an isolated layer under the first electrode layer and a second electrode layer under the isolated layer and connected to the first electrode layer.

6. The light source unit in claim 5, wherein the transparent encapsulator and the substrate collectively and hermetically cover the illuminant element.

7. The light source unit in claim 1, wherein the illuminant element is a vertical-cavity surface emitting laser chip.

8. An optical inputting module of an electronic device for sensing movement of an object, the optical inputting module comprising:
    an operation plane allowing the object sliding thereon;
    a circuit board located under the operation plane and substantially parallel to the operation plane;

a light source unit disposed on the circuit board and emitting light beam obliquely to the operation plane, the light source unit comprising a laser element and a transparent encapsulator, the laser element having an upper surface and a lower surface both parallel to the plane, the transparent encapsulator physically contacted with the illuminant element and at least covering the upper surface of the illuminant element, the transparent encapsulator having an oblique surface above the upper surface of the illuminant element and oblique to the upper surface, wherein the laser element is disposed inside the transparent encapsulator, and the light beam emitted from the laser element is refracted through the oblique surface to the object;

a sensing unit disposed on the circuit board for sensing images of the object operating on the operation plane; and a shield positioned around the sensing unit, having a through-hole above the sensing unit to allow the refracted light beam reflected by the object passing through and to prevent outward light beams from inputting into the sensing unit and scattering a sensing effect of the sensing unit so that an movement of the object is measured.

9. The optical inputting module in claim 8, wherein the oblique surface is obliqued with respect to the upper surface at angles between 5 and 25 degrees.

10. The optical inputting module in claim 8, wherein the transparent encapsulator covers the upper surface of the laser element and the transparent encapsulator has a bottom surface substantially parallel to the operation plane.

11. The optical inputting module in claim 10, wherein the transparent encapsulator hermetically covers the laser element.

12. The optical inputting module in claim 8, the light source unit further comprising a substrate physically contacted the lower surface of the laser element, the substrate having a first electrode layer connected to the laser element, an isolated layer under the first electrode layer and a second electrode layer under the isolated layer and connected to the first electrode layer.

13. The optical inputting module in claim 12, wherein the transparent encapsulator and the substrate collectively and hermetically cover the laser element.

14. The optical inputting module in claim 8, wherein the illuminant element is a vertical-cavity surface emitting laser chip.

* * * * *